Sept. 5, 1944.  C. W. HANSELL  2,357,401
PROTECTIVE ARRANGEMENT FOR RECTIFIERS
Filed April 24, 1941  2 Sheets-Sheet 2

INVENTOR
Clarence W. Hansell
BY H. C. Grover
ATTORNEY

Patented Sept. 5, 1944

2,357,401

UNITED STATES PATENT OFFICE 2,357,401

PROTECTIVE ARRANGEMENT FOR RECTIFIERS

Clarence W. Hansell, Port Jefferson, N. Y., assignor to Radio Corporation of America, a corporation of Delaware Application April 24, 1941, Serial No. 390,040

4 Claims. (Cl. 175—363)

This invention relates to a new and useful rectifier protective system.

An object of this invention is to provide a rectifier system which will suppress flash-backs or overloads occurring in the system.

Another object of this invention is to improve the operation of a radio transmitter by the use of non-linear resistors.

A feature of my invention is that, in rectifier protective systems, I make use of the overload current, itself, to provide energy to stop itself and to overcome the inherent disadvantages of previously known rectifier systems of which I am aware.

In the prior art, wherein grid-controlled gaseous discharge rectifiers are used, it is common practice to stop flash-backs or overloads by applying a negative blocking potential to the rectifier grids. Although these arrangements are in common use, they are subject, nevertheless, to a fundamental difficulty which can often cause failure of the system to function as intended. For example, in one system there was provided a relay arrangement through which an oxide rectifier was energized to apply negative bias to the control grids of the main rectifier after an overload or flash-back has occurred. Such a system has certain objectionable features, particularly when applied to circuits for radio transmission, primarily because of the time required for the relays to operate and the time for charging up smoothing condensers associated with the oxide rectifiers. Another serious objection is that at the time of the overload, short-circuit, or flash back, the voltage of the power source may be so far reduced that there is insufficient voltage to operate the relays and to build up sufficient negative bias in the rectifier circuit to clear the overload, short-circuit or flash-back. In other words, when the grid control is most needed, it may be entirely ineffective and then only the relatively slow acting sixty-cycle alternating current overload protection, or the low voltage circuit breaker releases, are available to clear a short-circuit after a relatively long time period during which permanent injury to the rectifier and associated equipment may have taken place.

In some other systems used in the prior art, a motor generator set is provided which runs continuously to provide a negative output which is applied to the control grids of the main rectifier by means of high speed relays when it is necessary to clear a short circuit in the rectifier or its load. In such a system, the mechanical inertia of the motor generator keeps it running and effective for a long enough time to block the rectifier with negative potential even though the power voltage may have been virtually removed from the driving motor due to the short circuit.

The complexity and expense of such systems is avoided by the present invention. Herein there is obtained a more reliable and failure-proof system by energizing the protective grid blocking equipment directly from the power leads, supplying the rectifier, so that the overload or short-circuit current, itself, establishes a blocking bias necessary to block itself, and to limit the short-circuit current. Briefly, in the simplest arrangement of my invention, current transformers have their primary windings connected in series with the power leads. Their secondary windings are arranged to supply an auxiliary rectifier, preferably that of the cuprous oxide or selenium types, from which grid blocking potentials are obtained. Then, if a flash-back or short-circuit should occur in the rectifier or load, the current drawn automatically builds up the blocking bias across a condenser to stop the overload current without any relays or similar mechanical devices being operated.

In order that the biasing rectifier may not be energized appreciably for rectifier currents up to normal full load, non-linear passive resistors are connected in series with the current transformer secondary. These non-linear resistors prevent much flow of current to the biasing rectifier up to the full load current input of the main rectifier, but for higher inputs, the resistance of the non-linear resistor automatically decreases to allow rapidly increasing current flow. In order that the biasing rectifier may be effective on moderate overloads without being subjected to excessive inputs or severe overloads, in case of heavy overloads or short circuits, a further aspect of my invention includes shunting the primary or secondary of the current transformers, the biasing rectifier input and the rectifier direct current output with additional non-linear resistors to automatically limit the negative voltage delivered to the main rectifier grids and the biasing rectifier.

This invention will best be understood by referring to the accompanying drawings, in which.

Figure 1:
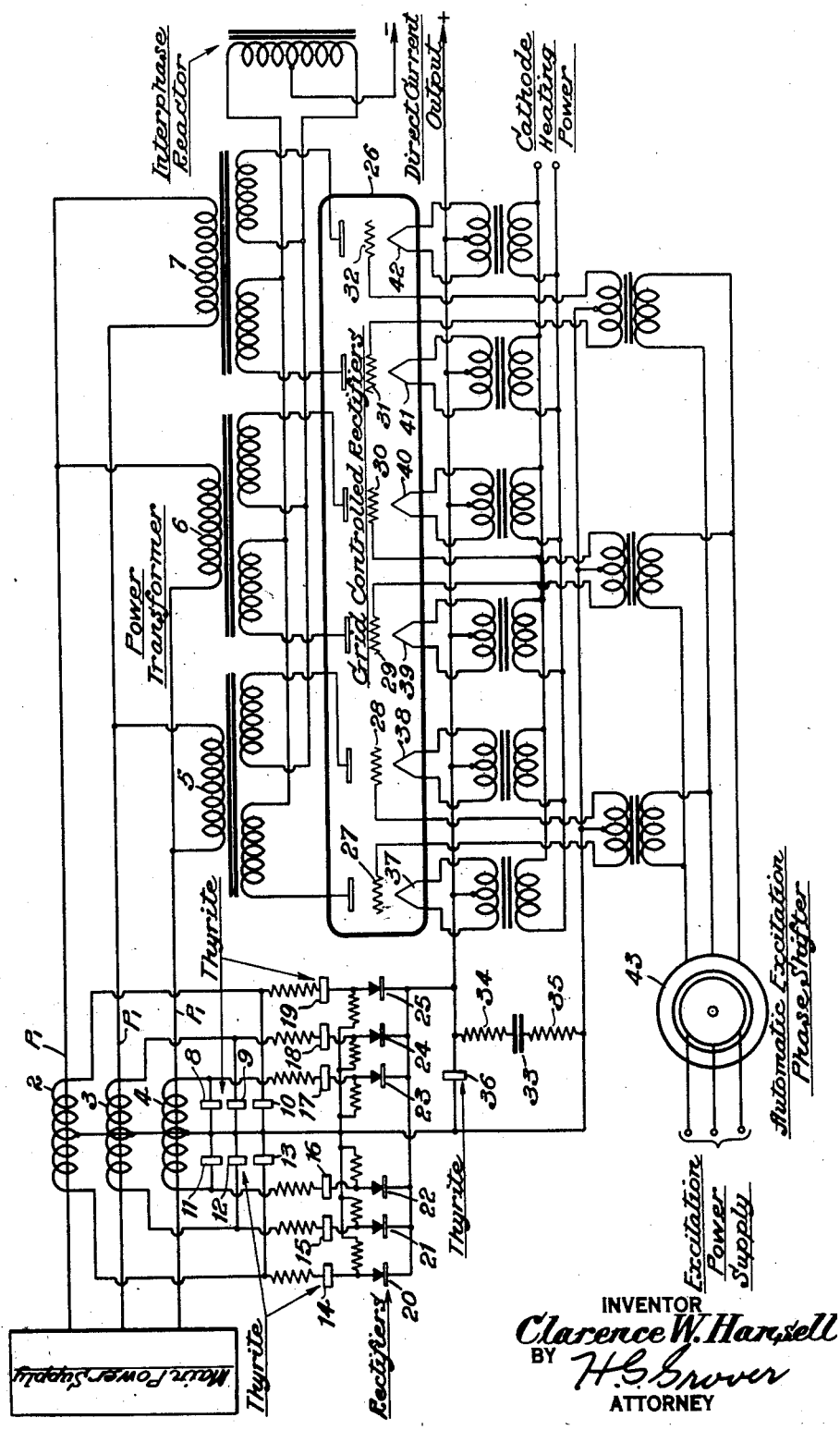
Fig. 1 is a circuit diagram of a three-phase, full wave rectifier with the features of my invention added thereto.
Figure 2:
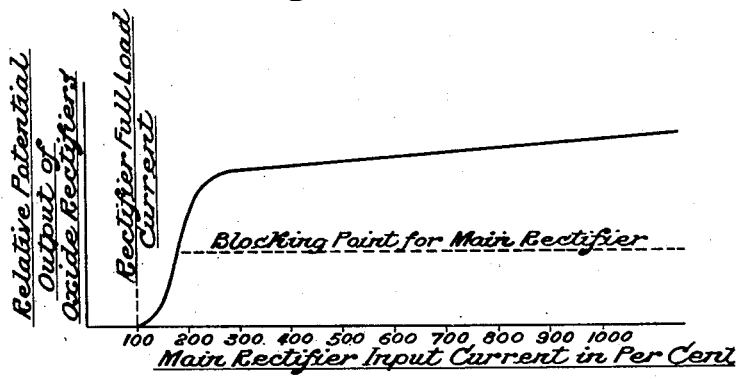
Fig. 2 is a curve of the current flow of the oxide rectifier showing how it follows the variation of the main rectifier input current.

Referring now in detail to Fig. 1 of the drawings, the main power supply 1 is connected to three auxiliary current transformers 2, 3 and 4 having their primaries P' connected in series with the input leads of the rectifier power transformer windings 5, 6 and 7. These auxiliary transformers may be so designed as to have low excitation reactance so that the voltage drop in the primary windings for normal rectifier input current is quite low. Preferably, the current transformers are equipped with cores having adjustable air gaps and with means for varying the number of turns in the circuit to facilitate adjustment. As an alternative arrangement, transformers may be used which have normally high excitation reactance provided the primary and/or secondary windings are shunted with an adjustable low impedance. The auxiliary transformers must have their windings insulated from one another and from ground for the voltages to which they are subjected in the circuit. Normally, the secondary windings of the auxiliary transformers must be quite highly insulated from the primary windings and in this respect will be quite like the highly insulated windings of cathode heating transformers which are well known in the prior art and normally used with the hot cathode type of rectifiers. Across the secondary windings S of the current transformers there are connected protective non-linear resistors 8, 9, 10, 11, 12 and 13, which are preferably that of the type known in the trade as "Thyrite," which possesses the property of rapidly decreasing resistance when the voltage across the resistors is increased. For example, ordinarily, a doubling of the voltage across a piece of "Thyrite" material increases the current through it about 12.6 times. In this case, the "Thyrite," which could be placed across the transformer primary P' in some cases, protects the whole grid biasing system from excessive potentials during short-circuits or flash-backs. There are also six additional "Thyrite" resistors 14, 15, 16, 17, 18 and 19 placed in series with the leads from the transformer secondary winding. These series "Thyrite" resistors cause only a very small current to flow when the main rectifier has normal input current but allow a rapidly increasing current when normal input current is exceeded. Then, when the proper selection and adjustment of the "Thyrite" resistors and of the ordinary resistances which may be associated with them in the circuits, as shown, has been made, potential appearing across the output of the oxide rectifier system comprising rectifiers 20, 21, 22, 23, 24, 25 and therefore the biasing potential applied to the grids of the main rectifier tubes follows a curve which is shown by Fig. 2. It will be noted that in this curve there is a variation which varies in value with variations in the main rectifier input current. The auxiliary rectifiers 20, 21, 22, 23, 24 and 25 are preferably of the copper oxide, selenium or similar dry non-vacuum rectifiers so polarized that overload currents in the input to the main rectifier 26 build up a negative blocking voltage on the control grids. Preferably, there is a condenser 33 connected across the output of the oxide rectifiers which has such as capacitance value as to hold the main rectifier grids negative for an appreciable time after a flash-back or short-circuit occurs, in order to allow deionization and cooling of the circuit elements at which the failure occurred which caused the overload. There may be resistance elements 34 and 35 connected in series with condenser 33 to prevent too much of a lag in the application of the negative blocking voltage to the main rectifier grids and to prevent momentary excessive main rectifier currents from discharging the condenser during flash-backs. A "Thyrite" resistor 36 is connected across the terminals of condenser 33 as shown to protect it from excessive potentials.

Although in Fig. 1, I have indicated the rectifier 26 as one utilizing high vacuum grid controlled tubes, or the Thyratron vapor or gaseous discharge type of tubes having hot cathodes 37, 38, 39, 40, 41 and 42, the main rectifier may, of course, be of the steel tank mercury pool type or any other type where the flow of current can be controlled by means of controlled electrode potential. Fig. 1, at 43, indicates a phase changer type of alternating current grid excitation or control for the main rectifier, but it is also my intention that the new protective system of this invention be used in combination with new or all other types of control and protective devices according to the results desired.

Figure 3:
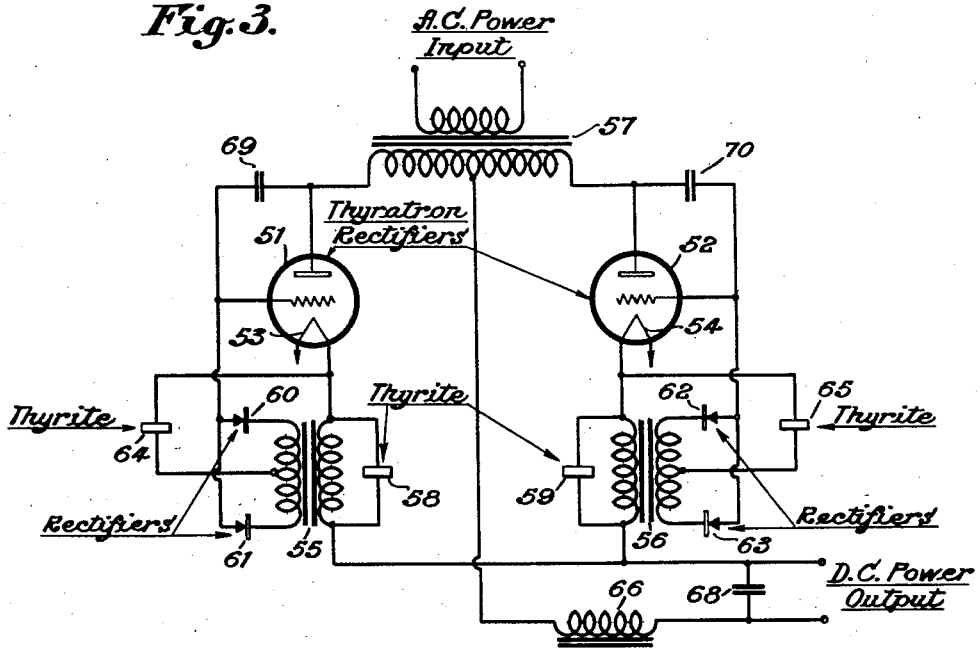
Fig. 3 shows another type of protective circuit including the features of my invention as applied to individual rectifier tubes.

For example, Fig. 3 shows two individual rectifier tubes 51 and 52, having their cathodes 53 and 54 connected to one side of the direct current power output through series connected auxiliary transformers 55 and 56. The midpoint tap of current input power transformer 57 connects through a reactance device 66 to the other side of the direct current power output. A condenser 68 is placed across the direct current power output circuit. The outer ends of the secondary of transformer 57 are connected to the anodes of rectifiers 51 and 52. Transformers 55 and 56 have "Thyrite" resistors 58 and 59 connected across their primaries. The secondary ends of transformers 55 and 56 are connected to rectifiers 60, 61, 62 and 63. A "Thyrite" resistor 64 is connected between the midpoint of the secondary of transformer 55 and one side of cathode 53. Rectifier tube 52 has its cathode 54 connected in a similar manner, that is, a "Thyrite" resistor 65 is connected in series between cathode 54 and the midpoint tap on the secondary of transformer 56. A condenser 69 is connected in series between the anode and grid of tube 51. Also, a condenser 70 is connected in series between the anode and grid of tube 52.

In the operation of the system of Fig. 3, an overload in the direct current circuits, or excessive current through the rectifiers 51, 52 from any cause results in the automatic application of a negative bias to the control grids to interrupt the current flow. In the case of gas or vapor rectifiers the interruption occurs when the anode currents, due to the alternating current input, pass through zero and continue for perhaps one to several cycles of alternating current input.

The two systems described above allow the rectifiers to become operative automatically again immediately after the flash-back or short-circuit is cleared. Thus, such an improved system provides an excellent type of protection where continuity of service is very important, such as for example, in a radio transmitting set wherein by experience it has been found that a large proportion of flash-backs or short-circuits can be followed immediately by the normal operation of the transmitter. However, the circuit of this invention does not provide for complete interruption of operation in case of a permanent failure or short-circuit, such as might be caused, for example, by the puncture of a by-pass or smoothing condenser in the output circuit of the main rectifier. To take care of permanent failures or short-circuits which are more than the ordinary momentary short-circuits or flash-backs, the ordinary overload devices of the kind which are well known in the prior art to shut off the power completely and to sound an alarm where there is a permanent failure or short-circuit may be included. Furthermore, if desired, the operating coil of a pulsating or ratchet type relay may be connected in series with the output of the oxide rectifiers 20 to 25, inclusive, shown in Fig. 1, and in Fig. 3, rectifiers 60 to 63, inclusive, or I may use a similar relay associated with the power circuit to shut off the power when the grid control functions several times in too rapid succession. Such devices are well known in power system control and are known as automatic circuit reclosers with automatic lockout.

Although only two embodiments of this invention are herein disclosed, it is to be distinctly understood that this invention should not be limited precisely thereto.

What is claimed is:

1. A protective circuit for a rectifier device comprising an anode, grid and cathode circuit, an alternating current source of power, a power transformer having a primary and a secondary, an auxiliary current transformer having a primary and a secondary, the primary of said auxiliary transformer connected in series with said power transformer and said alternating current source of power, an auxiliary rectifier connected across the secondary winding of said auxiliary transformer to build up in the grid circuit of said rectifier a potential to block the current flow therethrough, in case of overload, temporary short-circuit or flash-back in said rectifier circuit, said auxiliary rectifier being dependent for its operation solely upon potentials developed across the secondary of said current transformer, a non-linear passive resistance connected across said auxiliary transformer secondary, and another non-linear passive resistance connected in series with the auxiliary transformer secondary winding and said auxiliary rectifier.

2. A rectifier circuit including a discharge tube having a control electrode and means responsive to overload currents in said circuit and energized only by potentials developed as a result of said overload currents for applying a blocking potential to said control electrode, said means having associated therewith a resistor characterized in that its resistance varies inversely as the current flow therethrough whereby said blocking potential increases in amplitude more rapidly than the overload currents to a predetermined maximum and thereafter are maintained substantially constant.

3. A protective circuit for a rectifier having an anode, a cathode and a control grid, a power input circuit for said rectifier, a current transformer having a primary and secondary, said primary being connected in series in said input circuit, means for rectifying potentials developed across said secondary and operated solely by said potentials and means for applying said rectified potentials to said control grid to disable said rectifier, said current transformer having a resistor characterized in that its resistance varies inversely as the current flow therethrough connected across one of its windings whereby potentials developed across its secondary are limited to a predetermined maximum and other resistors serially connected in said means for applying rectified potentials to said control grid, said other resistors also being characterized in that their resistance varies inversely as the current flow therethrough.

4. A protective circuit for a rectifier having an anode, a cathode and a control grid, a power input circuit for said rectifier, a current transformer having a primary and a secondary, said primary being connected in series in said input circuit, means for rectifying potentials developed across said secondary and means for applying said rectified potentials to said control grid to disable said rectifier, said rectifying means and said applying means being responsive to and operated solely by potentials developed across said secondary, a resistor connected across one of the windings of said current transformer and a resistor serially connected in said means for applying rectified potentials to said control grid, said resistors being characterized in that the resistance varies inversely as the current flow therethrough whereby said rectifiers applied to said control grid increase in amplitude more rapidly than the current flow through said rectifier to a predetermined maximum and thereafter are maintained substantially constant.

CLARENCE W. HANSELL.